Nov. 6, 1951 D. M. COTTON 2,574,018
LUGGAGE RACK FOR AUTOMOBILES
Filed Dec. 14, 1948
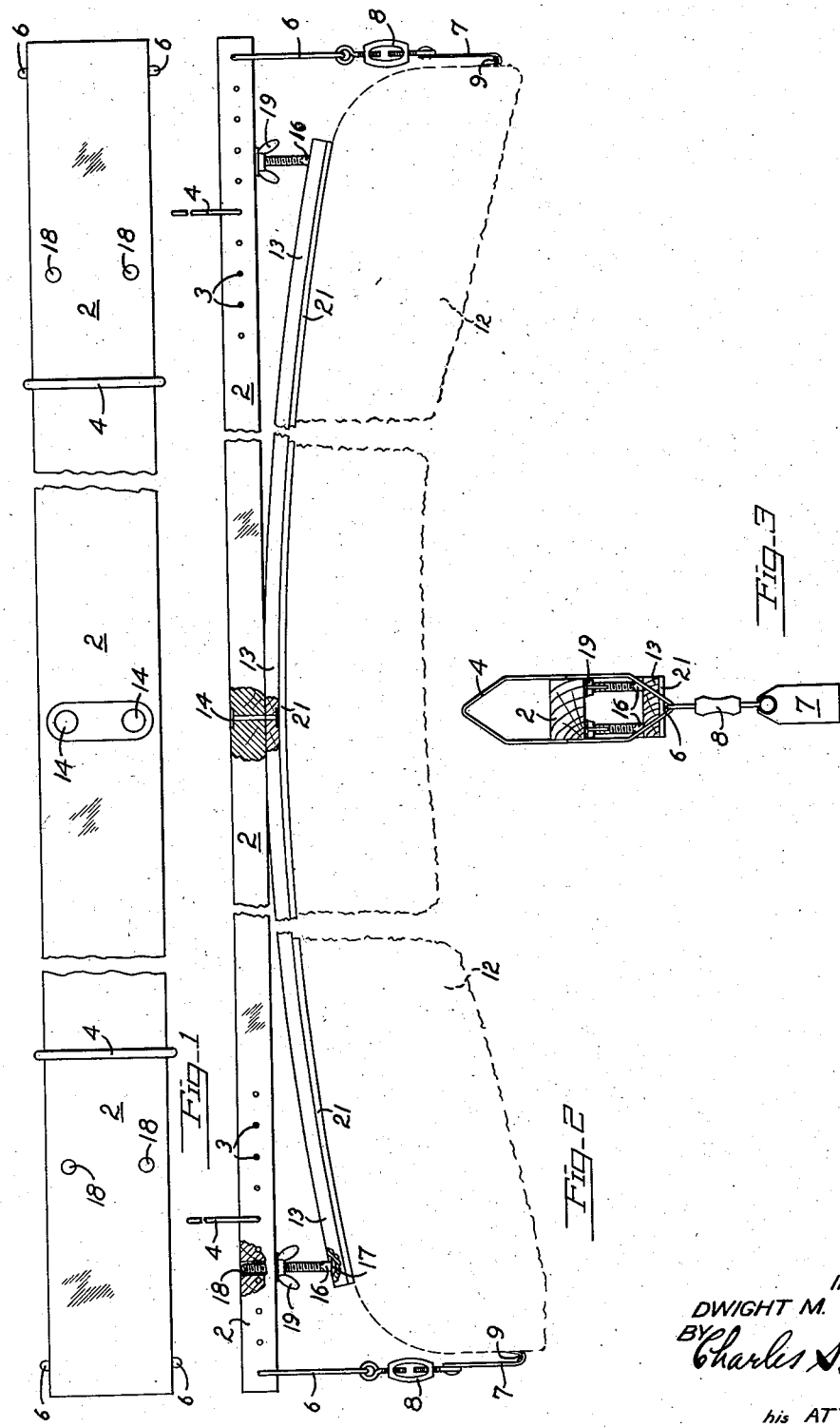
INVENTOR
DWIGHT M. COTTON
BY Charles S. Evans
his ATTORNEY Patented Nov. 6, 1951

2,574,018

UNITED STATES PATENT OFFICE 2,574,018

LUGGAGE RACK FOR AUTOMOBILES

Dwight M. Cotton, Oakland, Calif.

Application December 14, 1948, Serial No. 65,135

2 Claims. (Cl. 224—42.1)

My invention relates to racks for carrying luggage on the top or roof of a passenger automobile; and one of the objects of the invention is the provision of a rack which distributes its load evenly across the top. Another object is the provision of a rack with a wide range of adjustability to automobile tops of different curvature.

My invention possesses other objects and features of value, some of which, with the foregoing, will be set forth in the following description of my invention. It is to be understood that I do not limit myself to the showing made by the said description, and the drawings, as I may adopt variant forms of my invention within the scope of the appended claims.

Referring to the drawings: Figure 1 is a top view of one of the racks. The scale is approximately one-half of a satisfactory size, but portions of the figure have been omitted to reduce its length. Figure 2 is a side elevation of the rack as applied to an automobile top which is suggested by dotted lines. The scale is one-half that of Figure 1; and portions are omitted to reduce the length of the figure.

Figure 3 is an end elevation of the rack, and drawn to the same scale as Figure 2.

The top of a passenger automobile has long been utilized for carrying various articles which it is impossible or inconvenient to pack inside. Campers and hunters especially have found the tops of their cars handy places to pack cumbersome things such as bedding, tent poles, and skis. Since even the metal tops of present day automobiles are readily dented, and deformed by pressure, the loading of even a small amount of luggage on the top is certain to cause damage to it unless some means is provided to evenly distribute the load over the supporting surface. An important part of the problem is of course also the provision of reliable securement means to avoid shifting of the load under the swaying and vibration of travel over rough roads.

In terms of broad inclusion I provide a pair of rigid flat bars, each long enough to extend across substantially the full width of an automobile top. These base bars which are spaced several feet apart, receive the load to be carried, and are provided with handy loops to which the lashings may be tied so that the load is securely held in place on the bars.

Between each base bar and the automobile top is a flexible, cushioned foot which underlies the entire bar and is fixed to the bar at its mid point. Since the curvature of different automobile tops vary, means are provided near each end of the foot for forcing the end away from the rigid base bar, thus varying the curvature of the foot to fit the top curvature.

To still further insure even distribution of the load, an elastic liner or sole is provided for direct engagement with the top. The flexible foot, conforming to the top curvature provides a generally even bearing surface; and the cushion liner by small deformations, effects a substantially even distribution of the load, and also provides a non-skid bearing upon the car top. Means are also provided for clamping the ends of the base bar to the gutter bead of the car.

In greater detail and with reference to the drawings, each of my luggage racks comprises a flat and rigid base bar 2, preferably made of ash or hickory, and provided with a series of holes 3 in the sides near the ends in which the wire loops 4 are selectively engaged. These loops, of which there is one adjacent each end of each bar provide convenient eyes for tying the lashing ropes.

At each end of the base bar is a link for clamping the bar firmly to the automobile top. The link comprises a wire loop 6 pivotally engaging the bar end and connected to the hook 7 by the turn-buckle 8. The hook 7 is conditioned to catch under the gutter bead 9 fixed along the base edge of the automobile top 12. With a clamping link at each end of the bar, it is obvious that the bar may be held down securely against the automobile top.

Means are interposed between the top and the bar to distribute the load on the bar (including the weight of the luggage carried plus the pressure applied by the clamp links), over the area of the top roughly overlaid by the base bar.

Underlying the base bar for the major part of its length is a foot 13 comprising a wooden strip, rigidly fixed to the center of the base bar at its own center by rivets 14. This leaves each end of the foot free, and capable of being forced away from the rigid base bar by a pair of screws 16, each having a round head 17, seated in a depression near the end of the shoe strip. The threaded shank of each screw projects loosely into a hole 18 in the base bar, and a pair of wing nuts 19, threaded on the screws provides means for forcing the end of the shoe away from the base bar. The parts are so arranged and proportioned that the shoe can readily be curved concavely to conform closely to the convex curve of the automobile top; and because of two screws at the shoe ends, the shoe ends may be twisted or slanted laterally where that is required for an even bearing.

In order to avoid frictional wear on the top, and slippage under the severe vibration of rough roads; and also still further to evenly distribute the load, a cushion sole 21 preferably of rubber, is adhesively fixed on the under side of the shoe so that it lies between the shoe and the top when the rack is in place.

With racks in place near the front and the rear portions of an automobile top, the wing nuts 19 are adjusted to seat the cushioned shoes evenly on the arched top. The hooks 7 are then caught under the gutter bead and the clamp links tightened down, with such further adjustment of the wing nuts as is necessary to even pressures and insure firm seating. The load is then laid on the racks and secured with suitable lashings through the loops 4.

I claim:

1. A luggage rack for an automobile top comprising, a rigid base bar, a flexible foot fixed to the base bar adjacent its mid portion, a continuous elastic cushion sole on the foot, screw means including a screw having its head socketed in the end of the foot and its nut bearing against the adjacent side of the base bar interposed between each end of the foot and the base bar for varying the distance between the base bar and the end, and adjustable tie means for connecting the ends of the base bar to the automobile top.

2. A luggage rack for an automobile top comprising, a rigid base bar, a flexible foot fixed to the base bar adjacent its mid portion, a continuous elastic cushion sole on the foot, screw means interposed between the base bar and each corner of the foot ends for varying the distance between the base bar and each corner of the foot ends, and a tie including a turn-buckle and a hook for engaging the gutter bead of the automobile top arranged at each end of the base bar.

DWIGHT M. COTTON.

REFERENCES CITED

The following references are of record in the file of this patent:

UNITED STATES PATENTS

| Number | Name | Date |
|---|---|---|
| 1,895,208 | Salavsky | Jan. 24, 1933 |
| 1,958,169 | O'Neill | May 8, 1934 |
| 2,119,051 | Le Boeuf (I) | May 31, 1938 |
| 2,134,635 | Le Boeuf (II) | Oct. 25, 1938 |